United States Patent [19]

Kassai

[11] Patent Number: 5,676,419
[45] Date of Patent: Oct. 14, 1997

[54] SEAT FOR BABY CARRIAGE

[75] Inventor: Kenzou Kassai, Osaka, Japan

[73] Assignee: Aprica Kassai Kabushikikaisha, Osaka, Japan

[21] Appl. No.: 511,007

[22] Filed: Aug. 3, 1995

[30] Foreign Application Priority Data

Aug. 19, 1994 [JP] Japan ............................ 6-195079

[51] Int. Cl.⁶ .................................................. A47C 4/00
[52] U.S. Cl. ................................. 297/44; 297/452.57
[58] Field of Search ........................... 297/44, 45, 42, 297/452.57, DIG. 4; 280/642, 644, 250.1

[56] References Cited

U.S. PATENT DOCUMENTS

| | | |
|---|---|---|
| 1,865,254 | 6/1932 | Howe . |
| 2,847,058 | 8/1958 | Lee . |
| 3,501,197 | 3/1970 | Burton ........................ 297/452.57 X |
| 3,736,021 | 5/1973 | MacLaren . |
| 3,981,532 | 9/1976 | Caldwell ........................ 297/42 |
| 4,030,769 | 6/1977 | Peng et al. . |
| 4,042,250 | 8/1977 | Rodaway . |
| 4,335,893 | 6/1982 | Carmichael et al. . |
| 4,362,315 | 12/1982 | Kassai . |
| 4,428,598 | 1/1984 | Kassai . |
| 4,493,488 | 1/1985 | Panaia et al. ........................ 297/42 X |
| 4,697,823 | 10/1987 | Kassai . |
| 4,712,830 | 12/1987 | Charbrol et al. . |
| 4,885,820 | 12/1989 | Erceg et al. . |
| 5,050,663 | 9/1991 | Rhoads et al . |
| 5,101,536 | 4/1992 | Gabriele . |
| 5,123,129 | 6/1992 | Lyons . |
| 5,240,276 | 8/1993 | Coombs . |
| 5,288,098 | 2/1994 | Shamie . |

FOREIGN PATENT DOCUMENTS

| | | |
|---|---|---|
| 0663332A2 | 7/1995 | European Pat. Off. . |
| 1237538 | 1/1984 | U.S.S.R. . |
| 2044086 | 10/1980 | United Kingdom . |

*Primary Examiner*—Milton Nelson, Jr.
*Attorney, Agent, or Firm*—W. G. Fasse; W. F. Fasse

[57] ABSTRACT

A seat for a baby carriage has a seat portion with a plate-type core member therein. The core member is divided into a plurality of plate-type members by at least one longitudinally extending parting line for allowing the baby carriage to be collapsed along the direction of its width. Adjacent ones of the plurality of plate-type members are hinged together with each other by hinge tapes on lower surface sides thereof. When the plate-type members define a uniform plane, end surfaces thereof are butted against each other so as to maintain the uniform plane even when a baby is seated on the seat portion. Thereby, the baby's buttocks are prevented from sinking down into the seat, and the baby is relieved of muscular strain.

13 Claims, 5 Drawing Sheets

SEAT FOR BABY CARRIAGE

BACKGROUND OF THE INVENTION

1. Field of the Invention

The present invention relates to a seat for a widthwise collapsible baby carriage, and more particularly, it relates to an improvement of a core member in the seat portion of the seat.

2. Description of the Background Art

A seat of a collapsible baby carriage is generally formed independently of the body of the baby carriage. The seat, which comprises a seat portion and a backrest portion, is made of a flexible sheet material as a whole, and is so mounted on the body of the baby carriage that its shape is retained. Principal parts of the seat portion and the backrest portion have inserted or arranged therein a plate type core member made of a relatively rigid material.

This core member is so shaped and arranged as not to prevent the operation of collapsing the baby carriage. In a baby carriage which is collapsed widthwise, for example, the core member in the seat portion is formed by a plurality of plate-type members that are divided by at least one parting line extending longitudinally along the baby carriage. Thus, the seat portion can be bent along the parting line(s) or the portion(s) between adjacent ones of the plurality of plate-type members, thereby allowing collapse of the baby carriage along the direction of its width.

While the core member which is divided into a plurality of plate-type members as hereinabove described allows collapse of the baby carriage along the direction of its width, the core member does not provide positive rigid support and the seat portion may disadvantageously be bent along the portion(s) between the plurality of plate-type members even when the baby carriage is in an open state. Thus, the buttocks of a baby who is seated thereon sink uncomfortably into the seat. In order to prevent such a state to the utmost, some baby carriages employ a design in which a rigid link extending widthwise is in contact with the lower surface of the seat portion. Due to the structure of the baby carriage, however, it is difficult to provide such a rigid link with a relatively wide area. Thus, a region of the seat portion which is supported by the rigid link is extremely limited, and hence the buttocks of the baby are still sunk into the seat portion in a region not supported by the rigid link.

On the other hand, a baby carriage that is not collapsible widthwise causes substantially no problem of the aforementioned sinking, since its seat portion can have therein an integral core member defining a uniform plane. Thus the baby carriage which is collapsible widthwise is inferior in comfort as compared to that which is not collapsible widthwise, due to the aforementioned sinking in the seat portion.

SUMMARY OF THE INVENTION

Accordingly, an object of the present invention is to prevent the aforementioned problem of a baby's buttocks sinking in a seat mounted on a baby carriage which is collapsible widthwise. As hereinabove described, the present invention is directed to a seat mounted on a baby carriage that can be collapsed widthwise. This seat comprises a seat portion and a backrest portion, and the seat portion includes therein a plate-type core member which is made of a relatively rigid material. This core member comprises a plurality of plate-type members which are divided by at least one parting line longitudinally extending along the baby carriage. In such a seat for a baby carriage, adjacent ones of the plurality of plate-type members are hinged together with each other on lower surface sides thereof respectively, while these plate-type members have end surfaces which are butted against each other between the adjacent ones when the same define a uniform plane.

The plurality of plate-type members forming the core member, which are hinged with each other, allow collapse of the baby carriage along the direction of its width.

When the baby carriage is open, on the other hand, hinge portions for the plurality of plate-type members are positioned on the lower surfaces of the plate-type members so that the end surfaces are butted against each other between the adjacent ones of the plate-type members when the plurality of plate-type members define a uniform plane. Thus, the core member can maintain the uniform plane also when the weight of the baby is applied to the core member from above.

According to the present invention, therefore, it is possible to prevent the buttocks of the baby from sinking into the seat portion. Thus, the weight of the baby can be dispersed along a relatively wide area on the seat portion.

It has been recognized that the femoral muscles of the baby are relatively strained when the buttocks are sunk into the seat portion. According to the present invention, such sinking can be prevented so that the femoral muscles can be relieved from strain. Thus, the seat according to the present invention will not fatigue the baby who is seated thereon for a relatively long time.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS AND OF THE BEST MODE OF THE INVENTION

Figure 1:
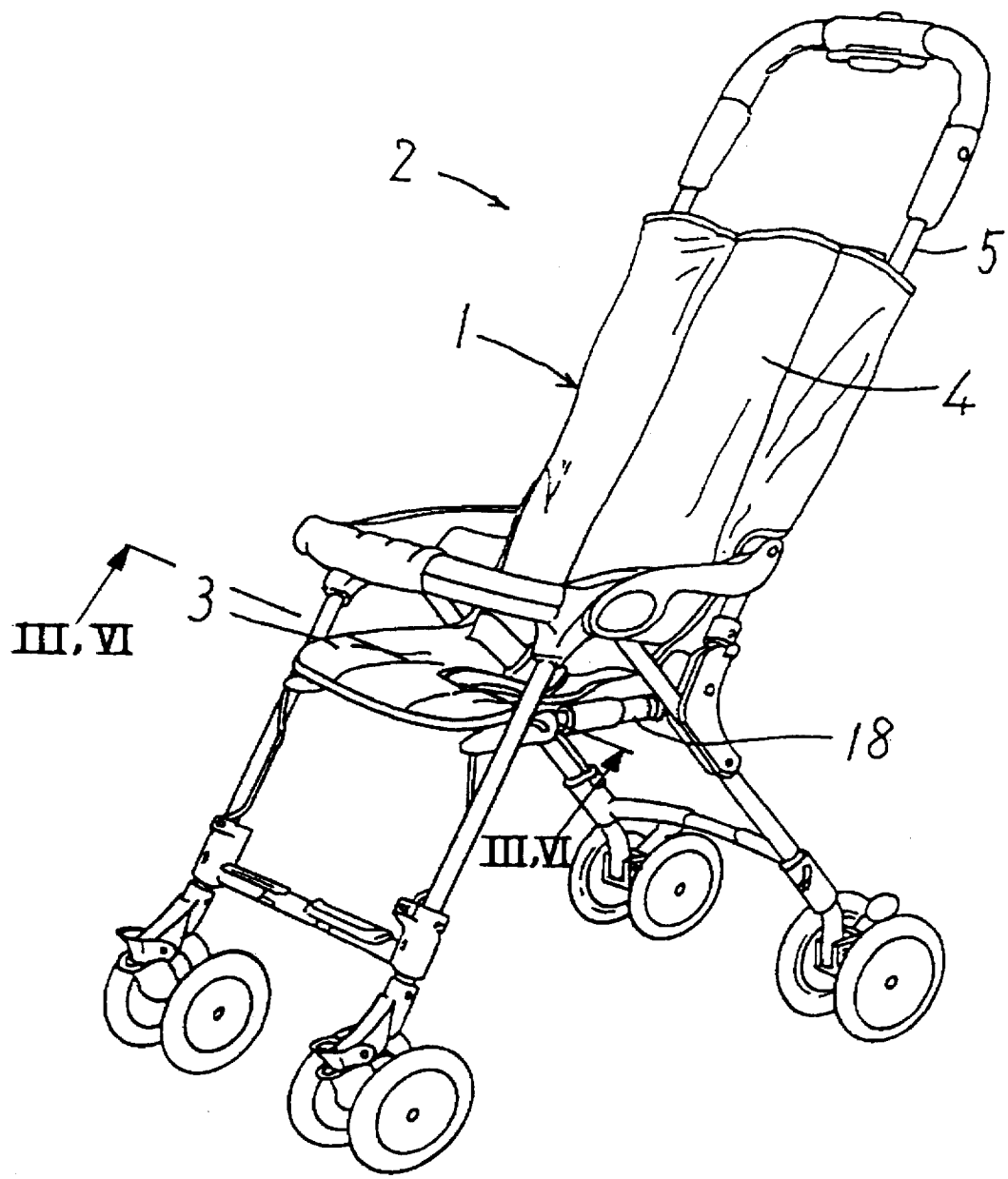
FIG. 1 is a perspective view showing a baby carriage 2 in an open state, comprising a seat 1 according to an embodiment of the present invention.
Figure 2:
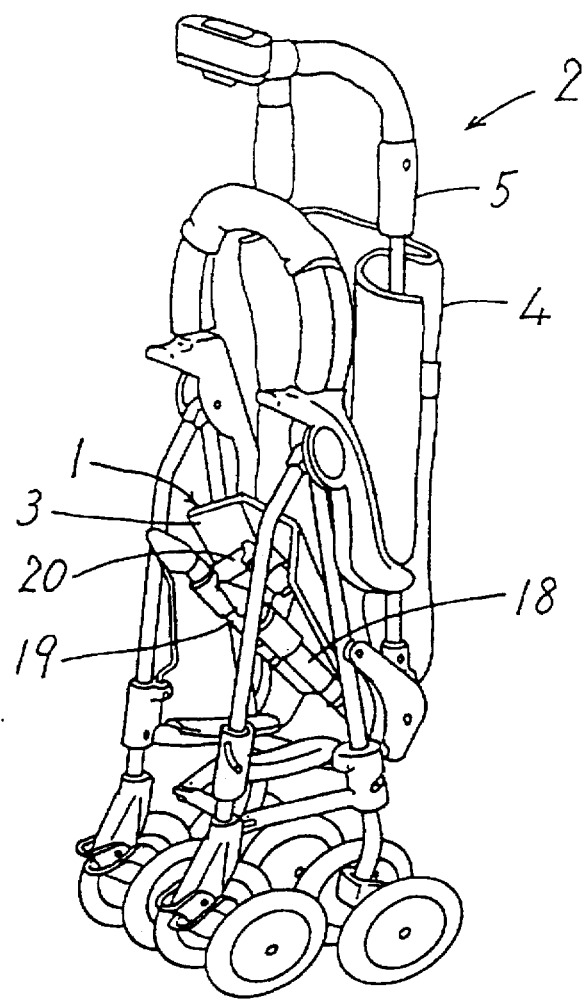
FIG. 2 is a perspective view showing the baby carriage 2 in a closed state.

FIG. 1 is a perspective view showing a baby carriage 2, which comprises a seat 1 according to an embodiment of the present invention, in an open state. FIG. 2 is a perspective view showing the baby carriage 2 in a closed state. As clearly shown in FIG. 1, the seat 1 comprises a seat portion 3 and a backrest portion 4. Both edges of the backrest portion 4 are respectively mounted on a push rod 5. As shown in FIG. 2, the seat 1 is so deformable as to allow an operation of collapsing the body of the baby carriage 2 along the direction of its width.

Figure 3:
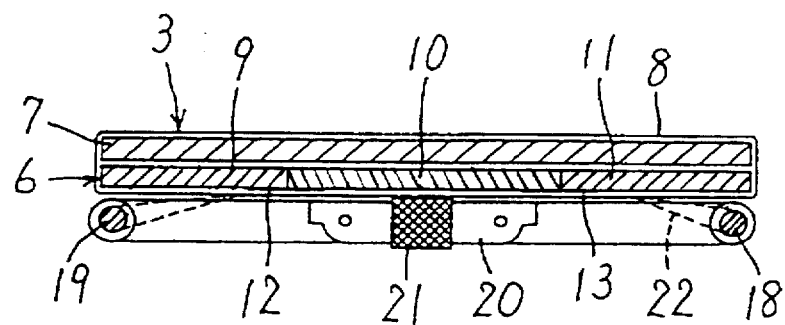
FIG. 3 is a cross-sectional view of a seat portion 3 shown in FIG. 1, taken along the section line III—III in FIG. 1 or FIG. 4.
Figure 4:
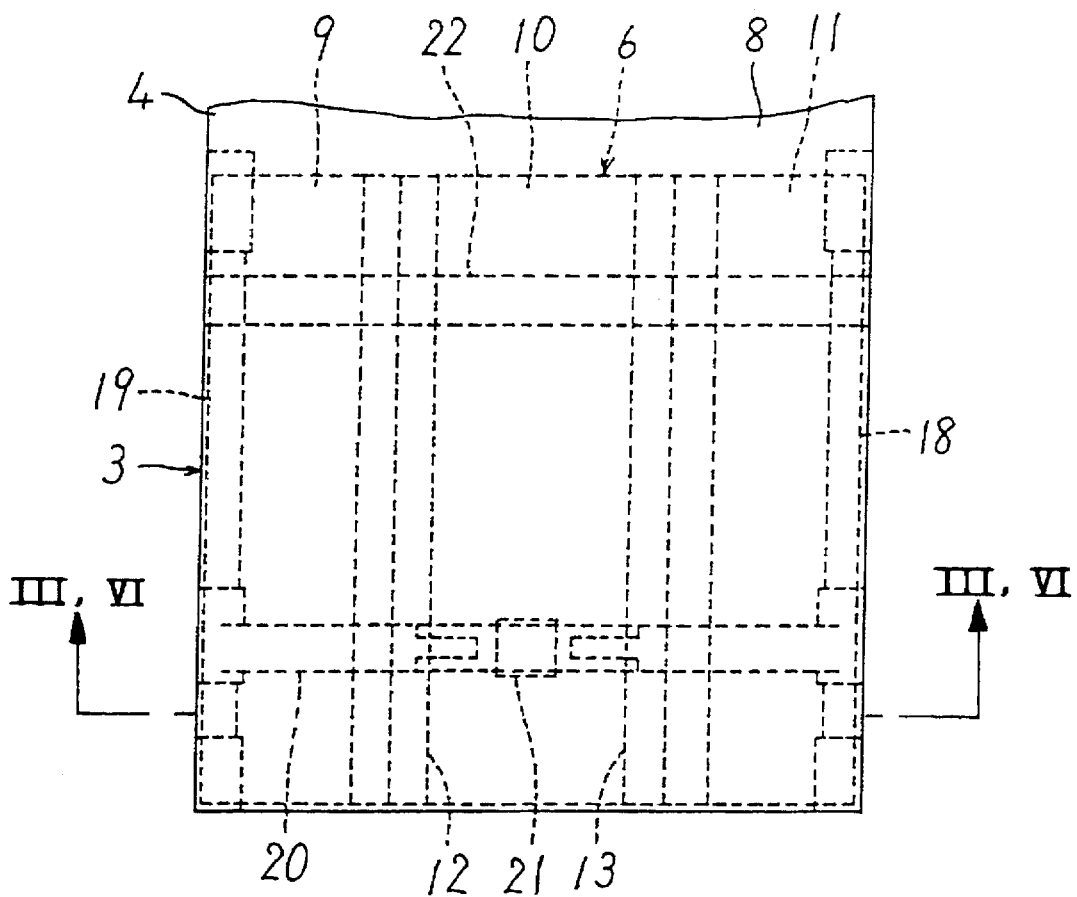
FIG. 4 is a plan view of the seat portion 3 shown in FIG. 1.
Figure 5:
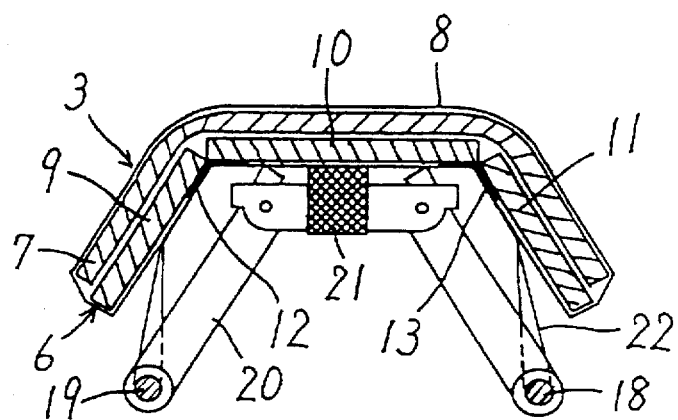
FIG. 5 is a cross-sectional view of the seat portion 3 corresponding to FIG. 3, but showing the seat portion 3 in a state attained in the closed state of the baby carriage 2 as shown in FIG. 2.

FIGS. 3 and 4 are respectively a cross-sectional view and a plan view showing the seat portion 3. FIG. 5 is a cross-sectional view corresponding to FIG. 3, but showing the baby carriage 2 in a collapsed state.

A plate-type core member 6 made of a relatively rigid material is arranged in the seat portion 3. Further, a cushion member 7 is arranged to cover an upper surface of the plate-type core member 6. The core member 6 and the cushion member 7 are covered with a flexible facing sheet 8. This facing sheet 8 integrally extends from the seat portion 3 to the backrest portion 4.

The core member 6 comprises three plate-type members 9, 10 and 11 which are divided by two parting lines longitudinally extending along the baby carriage 2 or especially along a front-to-back direction of the seat portion 3. The plate-type members 9 to 11 are formed by plate members made of plastic, for example, and are preferably formed by corrugated plastic boards, in order to reduce the weight of the baby carriage 2.

Figure 6:
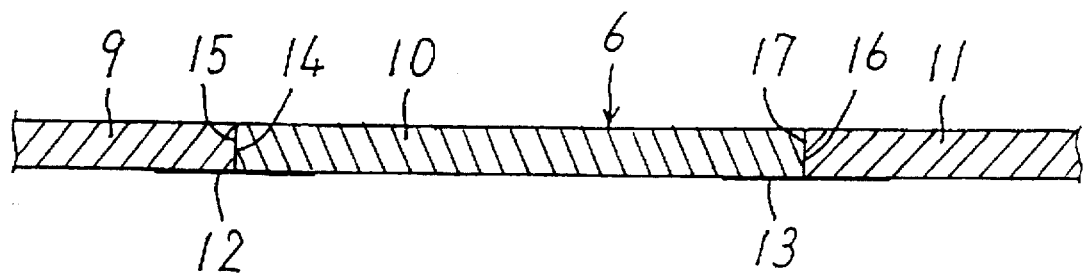
FIG. 6 is an enlarged detail cross-sectional view independently showing a core member 6 which is in the state shown in FIG. 3.
Figure 7:
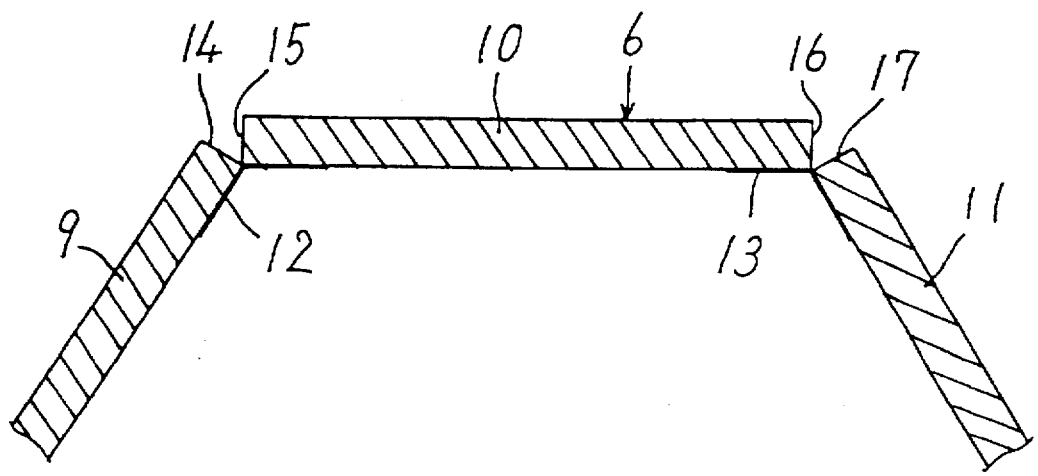
FIG. 7 is an enlarged detail cross-sectional view of the core member 6 corresponding to FIG. 6, but showing the core member 6 in the state shown in FIG. 5.

FIGS. 6 and 7 independently illustrate the core member 6 comprising the plate-type members 9 to 11. Adjacent ones of the plate-type members 9 to 11 are hinged together with each other on lower surface sides thereof. Hinge tapes 12 and 13 made of a repeatedly bendable flexible sheet material, for example, are employed for such hinging. These hinge tapes 12 and 13 are for example pasted to the lower surfaces of the plate-type members 9 to 11 respectively.

When the plate-type members 9 to 11 define a uniform plane, the adjacent pair of plate-type members 9 and 10 have end surfaces 14 and 15 which are butted against each other, while the other adjacent pair of plate-type members 10 and 11 also have end surfaces 16 and 17 which are butted against each other respectively. Thus, the core member 6 is foldable upwardly as shown in FIGS. 5 and 7, while the same is not foldable downwardly or in a direction opposite to those shown in FIGS. 5 and 7, from the state defining a uniform plane shown in FIGS. 3 and 6. Thus, the core member 6 maintains the plane state even when a downward force is applied to the central plate-type member 10, for example. In other words the core member 6 can be folded or bent upward, but is stiff against bending downward beyond a flat planar configuration.

The body of the baby carriage 2 comprises a horizontal or longitudinal pair of side bars 18 and 19 which are positioned on a lower surface side of the seat portion 3, and a connecting bar 20 that connects these side bars 18 and 19 with each other in such a manner that the spacing distance between the side bars is changeable. As shown in FIGS. 3 and 5, the connecting bar 20 can assume two states including a linear state and an upwardly bent state. The space between the pair of side bars 18 and 19 is changed by the operation of collapsing the baby carriage 2 along the direction of its width.

A belt 21 is wound on a cross-wise central portion of the aforementioned connecting bar 20, and is mounted on or connected to the lower surface of the seat portion 3. Another belt 22 is extended to connect the pair of side bars 18 and 19 with each other, and a cross-wise central portion of this belt 22 is also mounted on or connected to the lower surface of the seat portion 3. The seat portion 3 is mounted on the pair of side bars 18 and 19 and the connecting bar 20 by these belts 21 and 22, so as to follow the motions or operations of the side bars 18 and 19 and the connecting bar 20.

In the open state of the baby carriage 2 shown in FIG. 1, the seat portion 3 defines a uniform plane on the side bars 18 and 19 and the connecting bar 20 as shown in FIGS. 3, 4 and 6, and this state is maintained by the core member 6. When the baby carriage 2 is closed as shown in FIG. 2, on the other hand, the core member 6 is upwardly bent or folded as shown in FIGS. 5 and 7.

Figure 8A:
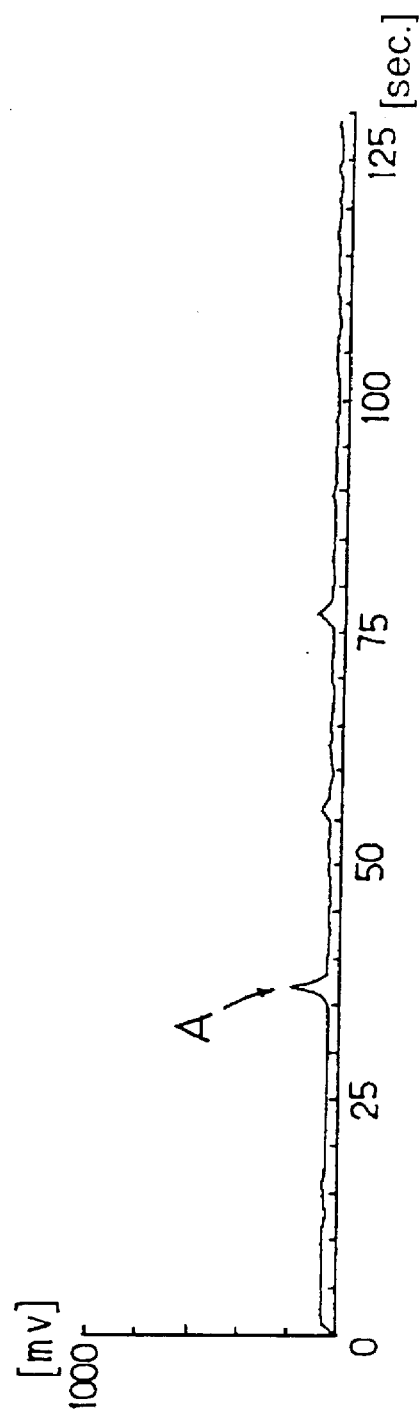
FIGS. 8A and 8B are electromyograms which were measured in babies sitting on the seat 1 according to the embodiment of the present invention and a seat comprising a core member consisting of a plurality of unhinged plate type members, respectively.
Figure 8B:
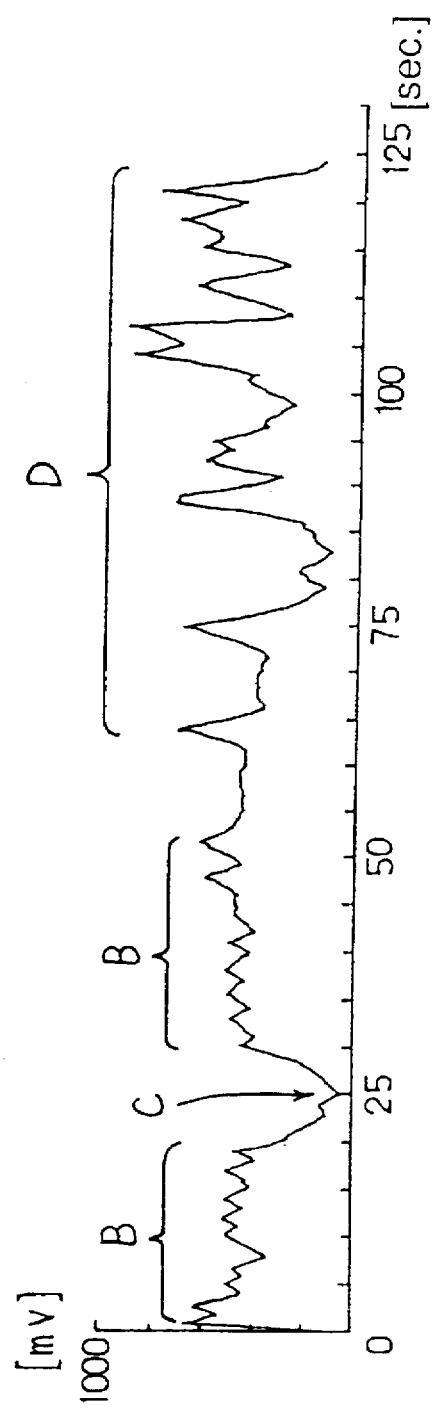

FIGS. 8A and 8B are electromyograms which were measured for confirming the effect of the present invention. These electromyograms were measured by sitting babies on seats of baby carriages in practice while attaching electrodes onto their thighs at intervals of 2 cm. FIG. 8A shows the case of the seat 1 according to the embodiment of the present invention, and FIG. 8B shows the case of a comparative seat comprising unhinged plate-type members.

The electromyogram shown in FIG. 8A exhibits transition at low levels with substantially no fluctuation. A peak A, for example, was obtained when the baby moved its legs. On the other hand, the electromyogram shown in FIG. 8B exhibits extreme fluctuation at relatively high levels. The regular fluctuation B, for example, shows muscular strain. Further, depression C shows temporary relaxation of the muscular strain. In addition, irregular and extreme fluctuation D in the rear half of the electromyogram shows muscular fatigue.

Comparing the electromyograms shown in FIGS. 8A and 8B with each other, it is understood that it is possible to sit a baby on the seat 1 according to the present invention in a state in which the baby's thighs are relieved of strain, thereby providing a comfortable state for the baby. This is because the buttocks of the baby do not sink into the seat portion 3 receiving its weight, and concentration of the weight onto a specific portion of the seat is prevented since the core member 6 maintains a plane state.

While the structure of the backrest portion 4 has not been clarified in the above description of the embodiment, a structure which is similar to that of the seat portion 3 may be employed for the backrest portion 4.

While the core member 6 is divided to be provided with the three plate-type members 9 to 11 in the aforementioned embodiment, the same may alternatively be divided into two or at least four portions, in response to the structure of the baby carriage.

While the flexible hinge tapes 12 and 13 are employed for hinging the plurality of plate-type members 9 to 11 with each other in the aforementioned embodiment, parts of the core member 6 along its thickness may alternatively be employed as hinge portions, or hinge members comprising pivot shafts may be employed, for example.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A seat for a baby carriage that can be collapsed widthwise, said seat comprising a seat portion and a backrest portion, said seat portion including therein a plate-type core member comprising a relatively rigid material, said core member comprising a plurality of plate-type members being divided by at least one parting line extending longitudinally along said seat portion, and adjacent ones of said plurality of plate-type members being hinged to each other on lower surface sides thereof, and having end surfaces being butted against each other when said plate-type members are arranged in a uniform plane, and further comprising a pair of side bars supporting said seat portion from below and being positioned on a lower surface side of said seat portion spaced apart from each other in a widthwise direction of said seat, and a connecting bar connecting said pair of side bars with each other, wherein said connecting bar is capable of assuming two states including a linear state and an upwardly bent state, wherein said connecting bar comprises a central connecting member being positioned at a widthwise center along said widthwise direction so as to maintain a horizontal orientation thereof, and a pair of side connecting members having first ends being rotatably connected to said central connecting member and second ends being rotatably connected to said side bars respectively, and wherein said plurality of plate-type members consist of a central plate-type member positioned at said widthwise center, and side plate-type members respectively connected to two side portions of said central plate-type member.

2. The seat for a baby carriage in accordance with claim 1, further comprising a hinge tape of a flexible sheet material being pasted to said lower surface sides at a boundary between said adjacent ones of said plate-type members.

3. A seat for a baby carriage that can be collapsed widthwise, said seat comprising a seat portion and a backrest portion, wherein said seat portion comprises a core member including a plurality of substantially rigid plate members that extend substantially in a longitudinal direction of said seat portion and that are arranged respectively adjacent one another along abutting paired side edge surfaces of said plate members across a widthwise direction of said seat portion, and including at least one hinge element that interconnects said adjacent plate members at a bottom edge of said side edge surfaces so as to render said core member bendable in an upward direction along said side edge surfaces of said plate members, and further comprising two side bars that extend substantially in said longitudinal direction along laterally outermost side edges of said seat portion below said core member, a cross bar that extends substantially in said widthwise direction below said core member and interconnects said side bars, a first connector member that connects said cross bar to a bottom of said seat portion, and a second connector member that connects said side bars to said bottom of said seat portion, wherein said first and second connector members respectively comprise flexible strap elements, and wherein said cross bar comprises a plurality of links articulated together at at least one hinge point so that said cross bar is bendable in an upward direction at said at least one hinge point.

4. The seat of claim 3, wherein said abutting paired side edge surfaces of said plate members are respectively substantially perpendicular to respective planes of said plate members.

5. The seat of claim 3, wherein said at least one hinge element and said abutting paired side edge surfaces are so arranged that said core member can assume a flat planar configuration and said paired side edge surfaces abut against each other in said flat planar configuration to resist downward bending of said core member beyond said flat planar configuration.

6. The seat of claim 3, wherein said at least one hinge element and said abutting paired side edge surfaces are so arranged that said core member is rendered bendable in an upward direction without limitation.

7. The seat of claim 3, wherein said hinge element comprises a flexible sheet material adhesively attached to a bottom surface of said plate members.

8. The seat of claim 7, wherein said flexible sheet material is a relatively narrow and long hinge tape extending as a strip on said bottom surface along said bottom edge of said abutting side edge surfaces.

9. The seat of claim 3, including exactly three of said plate members arranged respectively adjacent one another.

10. The seat of claim 3, wherein said seat portion further comprises a single continuous cushion member arranged on a top surface of said core member, and a cover sheet substantially enclosing said cushion member and said core member.

11. The seat of claim 3, including as many of said cross bar links as of said plate members, and including as many of said cross bar hinge points as of said abutting pairs of side edge surfaces of said plate members.

12. The seat of claim 3, wherein said at least one hinge point is respectively positioned below said abutting paired side edge surfaces and offset therefrom toward a widthwise center of said seat portion.

13. The seat of claim 3, wherein said flexible strap element of said second connector member extends between and interconnects said two side bars and is attached to said bottom of said seat portion.

* * * * *

UNITED STATES PATENT AND TRADEMARK OFFICE
CERTIFICATE OF CORRECTION

PATENT NO. : 5,676,419
DATED : Oct. 14, 1997
INVENTOR(S) : Kassai

It is certified that error appears in the above-identified patent and that said Letters Patent is hereby corrected as shown below:

Column 1, line 2, insert:

--CROSS-REFERENCE TO RELATED APPLICATION

This application is related to copending application U. S. Serial No.: 08/517,445, filed on August 21, 1995 and entitled "BABY CARRIAGE AND METHOD OF MANUFACTURING SEAT PLATE FOR ITS SEAT".--.

Signed and Sealed this

Seventeenth Day of February, 1998

Attest:

BRUCE LEHMAN

*Attesting Officer*  *Commissioner of Patents and Trademarks*